(12) United States Patent
Caveney

(10) Patent No.: US 7,370,106 B2
(45) Date of Patent: May 6, 2008

(54) NETWORK REVISION SYSTEM WITH LOCAL SYSTEM PORTS

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 708 days.

(21) Appl. No.: 09/992,034

(22) Filed: Nov. 23, 2001

(65) Prior Publication Data

US 2002/0069277 A1    Jun. 6, 2002

Related U.S. Application Data

(60) Provisional application No. 60/297,289, filed on Jun. 11, 2001, provisional application No. 60/270,811, filed on Feb. 23, 2001, provisional application No. 60/257,396, filed on Dec. 22, 2000, provisional application No. 60/252,517, filed on Nov. 22, 2000.

(51) Int. Cl.
*G06F 15/173* (2006.01)
(52) U.S. Cl. ..................................................... 709/224
(58) Field of Classification Search ................ 709/223, 709/224–226
See application file for complete search history.

(56) References Cited

U.S. PATENT DOCUMENTS

| | | | |
|---|---|---|---|
| 4,937,825 A | | 6/1990 | Ballard et al. |
| 5,161,988 A | | 11/1992 | Krupka |
| 5,270,658 A | * | 12/1993 | Epstein .................. 324/424 |
| 5,394,503 A | | 2/1995 | Dietz, Jr. et al. |
| 5,483,467 A | * | 1/1996 | Krupka et al. .............. 709/200 |
| 5,521,902 A | | 5/1996 | Ferguson |
| 5,532,603 A | * | 7/1996 | Bottman .................. 324/628 |
| 5,583,874 A | * | 12/1996 | Smith et al. ................. 714/712 |
| 5,726,972 A | | 3/1998 | Ferguson |

(Continued)

FOREIGN PATENT DOCUMENTS

FR    2680067    8/1991

(Continued)

OTHER PUBLICATIONS

Cable Management, The Great Cabling Treasure Hunt, by Mary Jander, Data Communications, dated Mar. 21, 1991, pp. 51-54.

*Primary Examiner*—Jason D Cardone
*Assistant Examiner*—Thomas Duong
(74) *Attorney, Agent, or Firm*—Robert A. McCann; Zachary J. Smolinski

(57) ABSTRACT

A revision system for a network having a plurality of data ports, pairs of the data ports being connectable by a patch cord to place the pairs of data ports into communication with each other, the revision system including a computer processor, a scanner in communication with the computer processor, the scanner capable of polling at least some of the data ports for determining connective status information therefrom, a plurality of local system ports disposed at distinct physical locations within the system, the local system ports in communication with the computer processor, and a portable information module for connecting to respective ones of the plurality of local system ports, whereby when the portable information module is connected to one of the local system ports, the portable information module may be placed into communication with and display information about respective ones of the data ports in the system.

20 Claims, 3 Drawing Sheets

U.S. PATENT DOCUMENTS

| | | | |
|---|---|---|---|
| 5,764,043 A * | 6/1998 | Czosnowski et al. | 324/66 |
| 5,847,557 A * | 12/1998 | Fincher et al. | 324/66 |
| 5,854,824 A | 12/1998 | Bengal et al. | |
| 5,870,626 A * | 2/1999 | Lebeau | 710/11 |
| 5,878,030 A * | 3/1999 | Norris | 370/241 |
| 5,892,756 A * | 4/1999 | Murphy | 370/241 |
| 5,898,837 A | 4/1999 | Guttman et al. | |
| 5,923,663 A * | 7/1999 | Bontemps et al. | 370/445 |
| 6,002,331 A * | 12/1999 | Laor | 340/539.1 |
| 6,041,352 A | 3/2000 | Burdick et al. | |
| 6,094,261 A * | 7/2000 | Contarino, Jr. | 356/73.1 |
| 6,175,865 B1 | 1/2001 | Dove et al. | 709/220 |
| 6,222,908 B1 * | 4/2001 | Bartolutti et al. | 379/27.01 |
| 6,229,538 B1 * | 5/2001 | McIntyre et al. | 715/734 |
| 6,234,830 B1 * | 5/2001 | Ensz et al. | 439/491 |
| 6,285,293 B1 * | 9/2001 | German et al. | 340/687 |
| 6,381,283 B1 * | 4/2002 | Bhardwaj et al. | 375/257 |
| 6,434,716 B1 * | 8/2002 | Johnson et al. | 714/712 |
| 6,453,014 B1 * | 9/2002 | Jacobson et al. | 379/26.01 |
| 6,456,768 B1 * | 9/2002 | Boncek et al. | 385/100 |
| 6,522,737 B1 * | 2/2003 | Bartolutti et al. | 379/156 |
| 6,574,586 B1 * | 6/2003 | David et al. | 702/183 |
| 6,629,269 B1 * | 9/2003 | Kahkoska | 714/43 |
| 6,684,179 B1 * | 1/2004 | David | 702/183 |
| 6,725,177 B2 * | 4/2004 | David et al. | 702/183 |
| 6,778,911 B2 * | 8/2004 | Opsal et al. | 702/27 |
| 6,992,491 B1 * | 1/2006 | Lo et al. | 324/533 |
| 7,005,861 B1 * | 2/2006 | Lo et al. | 324/533 |
| 7,028,087 B2 * | 4/2006 | Caveney | 709/224 |
| 7,068,043 B1 * | 6/2006 | Lo et al. | 324/533 |
| 7,068,044 B1 * | 6/2006 | Lo et al. | 324/534 |
| 7,160,143 B2 * | 1/2007 | David et al. | 439/489 |

FOREIGN PATENT DOCUMENTS

| | | |
|---|---|---|
| GB | 2236398 | 4/1991 |
| GB | 2347752 A | 9/2000 |
| WO | WO 99/26426 | 5/1999 |
| WO | WO00/60475 | 10/2000 |

* cited by examiner

NETWORK REVISION SYSTEM WITH LOCAL SYSTEM PORTS

RELATED APPLICATION

This application is claiming priority to the following previously filed U.S. provisional patent applications: Ser. Nos. 60/252,517 filed Nov. 22, 2000; 60/257,396 filed Dec. 22, 2000; No. 60/270,811 filed Feb. 23, 2001; and 60/297,289 filed Jun. 11, 2001; the entirety of the previously filed applications being incorporated herein by reference.

BACKGROUND OF THE INVENTION

As communication network utilization and technology continues to escalate, the typical local area network (LAN) is simultaneously growing larger and denser, resulting in an exponential growth in the number of cord connections needed between ports in respective patch panels, communication switches, equipment, etc., to maintain appropriate network functionality. Each such connection typically entails a cord (cable) of suitable type connecting a pair of jacks, adapters, or other connector ports in the network. Sometimes the connected ports are only inches apart; other times, the ports are disposed relatively farther apart. As the density and volume of needed cabling has increased, "spaghetti" cabling, a term colorfully describing a dense, chaotic arrangement of cables and the resultant difficulty of tracking a single cable from end to end in the LAN, has correspondingly become more commonplace and more problematic.

A primary purpose of LANs is to strategically place most or all of the routing-determinative connective hardware of a network within a single location so as to increase the efficiency of reconfiguring routing and communications connections. This purpose is being significantly thwarted by the increased presence and severity of spaghetti cabling, particularly when larger LANs are involved.

Nevertheless, until fairly recently, LAN operators primarily maintained only manual documentation relating to LAN connections, an endeavor that has become increasingly daunting as LAN size and sophistication continues to proliferate. Under a manual documentation scheme, when changes were needed in a particular LAN configuration, the operator would be faced with the complex problem of determining whether and which cords needed to be added, removed, or transferred (re-routed on one end). The problem became even more complex when the order of such steps needed to be considered, i.e., which cord to change before which other cord. The problem became still more complex when one considered cord length issues. Assuming the LAN operator even kept accurate records about the length of cord used to maintain particular connections within the LAN, there would still be the formidable task of determining whether a particular cord was sufficiently long, for example, to be moved from a particular port on one network rack to a different port on another network rack.

In many of the LAN installations today, time is of the essence in completing required revisions to the LAN cabling configuration. For example, if electronic network equipment malfunctions, critical communications could be interrupted, necessitating rapid connection of a destination to a new source, which, in turn, requires a rapid change in the LAN cabling. When a revision to the LAN cabling configuration is made, it is essential that each step is performed correctly. If a cabling revision step is made incorrectly, it could disrupt vital communications.

In addition, given the high cost of technically skilled labor, employing an operator and one or more revisors to sporadically or continuously monitor and reconfigure a LAN, can be very costly. Thus, trying to efficiently reconfigure these spaghetti cable networks has become very complex, very time consuming, very confusing, and very costly. As such, there has been a need for an improved manner of monitoring and reconfiguring such systems. Fortunately, networking problems of the type described are efficiently addressed by computer algorithms, and some efforts have been made to address the problem of inefficient and costly reconfiguration in this manner.

In particular, the use of polling terminals in a patch panel and automatic documentation of configurational changes is disclosed in UK patent application GB2236398A to Carter et al, filed Sep. 29, 1989. "The Great Cabling Treasure Hunt" by Mary Jander, published Mar. 21, 1991 in Data Communications, discusses some ways in which software can help LAN administrators gain and maintain control over their organization's cabling resources. U.S. Pat. No. 5,483,467 to Krupka et al. discloses a particular example of such an application in which a computer or microprocessor employs a scanner to continuously sense the interconnection arrangement or configuration of the LAN cabling. Much in line with the teachings of the Carter application, Krupka discloses the logic circuitry of the computer or microprocessor receiving intermittent scanning inputs through a detection matrix to insure that the actual cabling configuration is in conformity with what is designed. The Krupka scanner may provide an interconnection status output to the computer or to a dedicated output device. One type of dedicated output device for displaying the interconnection status of a LAN is an array of lights disposed in corresponding relationship to particular ports within the LAN.

It is thus known to have a LAN with output lights associated with particular ports in the network wherein the lights are selectively lit to indicate information relating to the comparison between an existing connection pattern and a predetermined desired connection configuration. Such systems have proven to be fairly advantageous relative to the difficulty of manually monitoring, documenting, and changing configurations. Nevertheless, the automatic documentation and reconfiguration systems developed to date have significant shortcomings with regard to reconfiguring LAN cabling.

Reconfigurations typically entail a LAN revisor performing a series of revisions to the connections between ports by cords. Sometimes it is necessary to introduce a new cord to connect two previously open ports within the network, thereby adding ("addition") a cord to the system. Other times, one needs to completely remove ("removal") an already installed cord, thereby disconnecting the cord from two ports previously connected to one another. Sometimes, one end of a cord needs to be moved from one port to another ("transfer") while the other end stays connected. In an automatic documentation and reconfiguration management system, such as one controlled by a computer or processor as described generally above, hereinafter called "the system," a reconfiguration typically involves a series of instructions, i.e., additions, removals, and transfers, communicated by the system to the revisor, which may include communication by illuminating appropriate lights corresponding to the relevant ports where cords need to be plugged in or removed.

Currently, under one such automatic revision system, for example, to indicate a necessary "addition", lights are illuminated adjacent the two ports into which the cord ends must be inserted. Since the system cannot ascertain a change in the configuration until both ends are plugged in, the lights do not change upon insertion of the first end of the cord, but both turn off when the second end is appropriately inserted. As such, when the revisor inserts the first end of the cord, there is no light signal or other confirmation to indicate whether he has correctly completed this step. Given the high density of data ports in current networks and the usual need for a reconfiguration to be performed quickly, the rate of revisor error is significant. Additionally, if the two lights are in places where they cannot be seen from where the revisor is standing, the revisor must first find both lights, visually approximate the distance between them, and guess at the minimal length of cord needed to connect the corresponding ports. Of course, a cord that is too short will result in a failed effort to make the connection, thereby wasting expensive time; a cord that is too long will produce wasteful slack that contributes to spaghetti cabling.

Currently for removals, lights are typically illuminated next to the two ports from which the respective cord ends must be removed. Since the connection to the system is broken by the removal of the first end from the first port, the system considers the cord "removed" when the first end is removed. For reasons of waste, cost, spaghetti cabling, and freeing the second port for future use, it is necessary to remove the second end of the cord. Because the cord is considered removed upon the removal of its first end, however, the two lights are both turned off at this point, thereby making it very difficult for the revisor to find the other end of the cord, particularly if the length of the cord is partially or totally hidden. Furthermore, the revisor will have no light indicator or other confirmation if and when he correctly performs the removal of the other end.

It is not known whether prior systems employ specialized routines for transferring a cord end from one port to another, but one might presume that transfers in prior systems are performed by breaking them down into a cord removal followed by a subsequent cord addition. Sometimes, such a procedure would result in the inefficient unplugging of a cord end from a port only to have the same end immediately reinserted into the same data port in the subsequent step. Thus, additions, removals, and transfers still can be very cumbersome with current electronic systems and have much inefficiency existent in current procedures.

SUMMARY OF THE INVENTION

In one form of the invention there is a revision system for a network having a plurality of data ports, pairs of the data ports being connectable to place the pairs of data ports into communication with each other, the revision system including a computer processor, a scanner in communication with the computer processor, the scanner capable of polling at least some of the data ports for determining information therefrom, a plurality of local system ports disposed at distinct physical locations within the system, the local system ports in communication with the computer processor, and a portable information module for connecting to respective ones of the plurality of local system ports, whereby when the portable information module is connected to one of the local system ports, the portable information module may be placed into communication with and display information about respective ones of the data ports in the system.

In another form of the invention there is provided a portable information module for use in a revision system including a plurality of data ports, pairs of the data ports being connectable to place the pairs of data ports into communication with each other, a computer processor, a scanner in communication with the computer processor, the scanner capable of polling at least some of the data ports for determining connective status information therefrom, a plurality of local system ports disposed at distinct physical locations within the system, the local system ports in communication with the computer processor, the portable information module including a system port connector for enabling connection with respective ones of the local system ports, a data port connector for enabling connection with respective ones of the data ports, and an indicator for conveying information to the user information regarding the status of the revision system.

In yet another form of the invention, there is provided a method for obtaining information regarding the status of a revision system, the revision system including a plurality of data ports, pairs of the data ports being connectable to place the pairs of data ports into communication with each other, a computer processor, a scanner in communication with the computer processor, the scanner capable of polling at least some of the data ports for determining connective status information therefrom, and a plurality of local system ports disposed at distinct physical locations within the system, the local system ports in communication with the computer processor, the method including the steps of providing an information module having a system port connector, a data port connector, and an indicator, connecting the system port connector to one of the plurality of local system ports, connecting the data port connector to one of the data ports in the system, and observing the indicator to obtain information regarding the status of the revision system.

In yet a further form of the invention, there is a revision system for a network having a plurality of data port, pairs of the data ports being connectable to place the pairs of data ports into communication with each other, the revision system including a computer processor, a scanner and communication with the computer processor, the scanner capable of polling at least some of the data ports for determining information therefrom, a plurality of local system ports disposed at distinct physical locations within the system, the local system ports in communication with the computer processors, and at least one visual indicator corresponding to and disposed proximately to at least a plurality of the data ports, whereby when one of the data ports is placed in communication with one of the local system ports, the visual indicator corresponding to the data port may display information about the corresponding data port.

In yet a further form of the invention, there is a revision system for a network having a plurality of data ports, pairs of said data ports being connectable to place the pairs of data ports into communication with each other, the revision system including a computer processor, a port plate corresponding to each of the data ports in the system, a scanner in communication with the computer processor, the scanner capable of polling at least some of the port plates for determining information therefrom, a plurality of local system ports disposed at distinct physical locations within the system, the local system ports in communication with the computer processor, and at least one visual indicator corresponding to and disposed proximately to at least a plurality of the port plates, whereby when one of the port plates is placed in communication with one of the local system ports, the visual indicator corresponding to the port plate may display information about the corresponding port plate.

In yet a further form of the invention, there is a revision system for a network having a plurality of data ports, pairs of the data ports being connectable to place the pairs of data ports into communication with each other, the revision system including a computer processor, a port plate corresponding to each of the data ports in the system, a scanner in communication with the computer processor, the scanner capable of polling at least some of the port plates for determining information therefrom, a plurality of local system ports disposed at distinct physical locations within the system, the local system ports in communication with the computer processor, and a portable information module for connecting to respective ones of the plurality of local system ports, whereby when the portable information module is connected to one of the local system ports, the portable information module may be placed into communication with and display information about respective ones of the port plates in the system.

In yet a further form of the invention, there is a method for obtaining information regarding the status of a revision system, the revision system including a plurality of data ports, pairs of the data ports being connectable to place the pairs of data ports into communication with each other, a computer processor, a port plate corresponding to each of the data ports in the system, a scanner in communication with the computer processor, the scanner capable of polling at least some of the port plates for determining connective status information therefrom, and a plurality of local system ports disposed at distinct physical locations within the system, the local system ports in communication with the computer processor, the method including the steps of providing an information module having a system port connector, a port plate connector, and an indicator, connecting the system port connector to one of the plurality of local system ports, connecting the port plate connector to one of the port plates in the system, and observing the indicator to obtain information regarding the status of the revision system.

DETAILED DESCRIPTION OF PREFERRED EMBODIMENTS

The invention is directed to apparatus and methods for facilitating the efficient maintenance and/or reconfiguration of a LAN using a system which includes an automatic direction and response system and a scanner system.

The complete disclosures of the previously filed provisional patent applications Ser. Nos. 60/252,517 filed Nov. 22, 2000; 60/257,396 filed Dec. 22, 2000; 60/270,811 filed Feb and No. 60/297,289 filed Jun. 11, 2001 are incorporated herein by reference.

Figure 1:
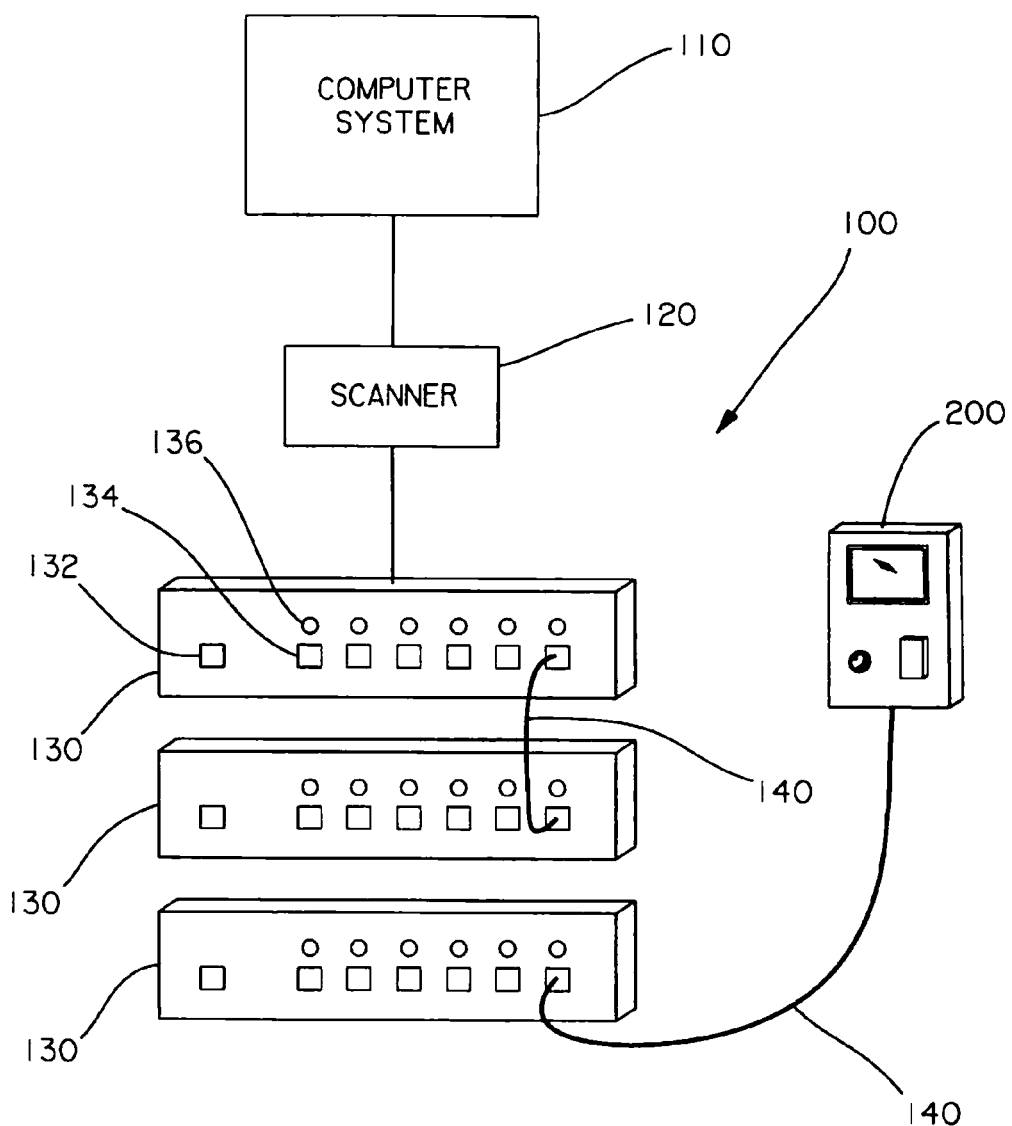
FIG. 1 is a schematic view of a first patch cord and a first probe tip in accordance with an embodiment of the invention.

The LAN 100, as shown in FIG. 1, may include a scanner 120, an optional information module 200, a number of network racks 130 having arrays of data ports 134 interconnected by a large number of cords 140, LEDs 136 adjacent to tile data ports 134, and a multitude of system ports 132 for connection to the system. Like other LAN reconfiguration direction and response systems, instructions for reconfiguring the LAN are determined and communicated by a computer system 110 or the like which controls the LAN. However, relative to currently existing systems, in a preferred embodiment of the invention, the instructions provide more direction to the revisor, the instructions are more specific, the instructions provide a more efficient sequence of steps to implement the desired reconfiguration, the instructions are delivered more accessibly to the revisor, and the revisor receives immediate confirmation upon completion of each step in a revision/reconfiguration.

Among the many improvements contemplated by the present invention is the conveyance of more information about a particular step within a reconfiguration. In particular; the inventive system may include an optional information module having an output display for the revisor to carry with him during the reconfiguration. The information module can access information from the system from anywhere in the LAN by plugging it into one of a number of system ports for communication with the system. Such an information module may preferably include an appropriately configured jack for receiving one end of a patch cord to thereby electrically connect the patch cord (and any data port at the end thereof) to the system through the information module. Wireless communication between the information module and the system is also considered possible and contemplated to be within the scope of the invention. Carrying the information module obviates the need for the revisor to repetitively return to one designated site within the LAN where instructions are visually displayed, such as on a computer monitor, or carry with him a printed series of instructions.

Figure 2:
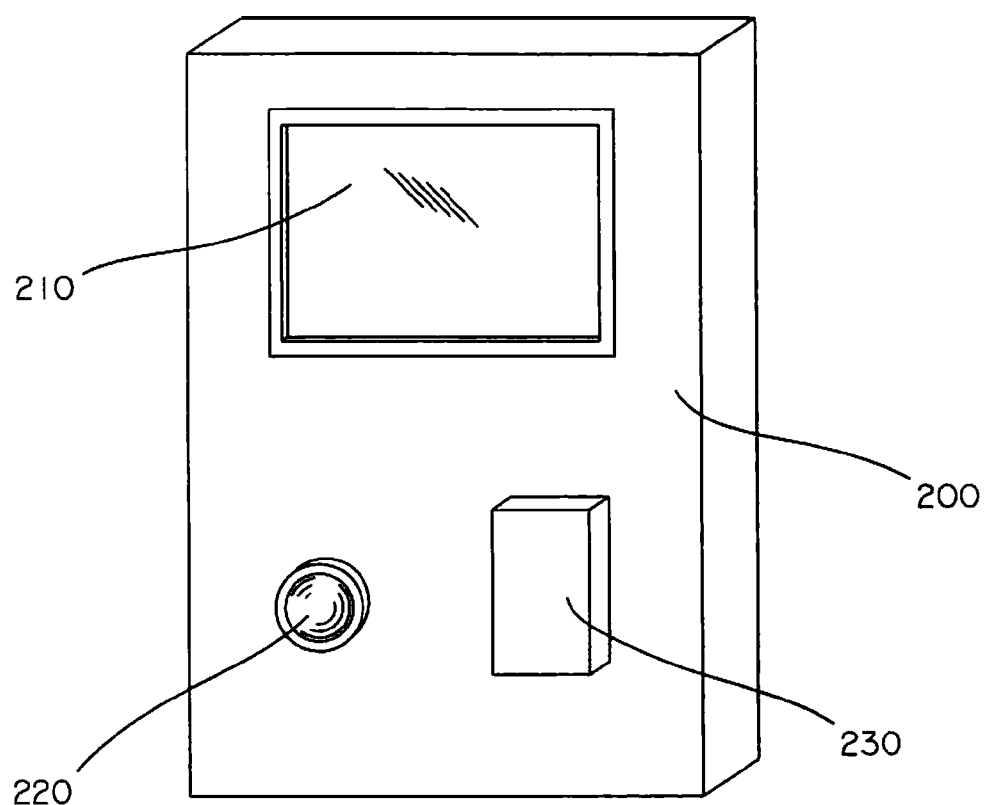
FIG. 2 is a schematic view of a second patch cord and a second probe tip in accordance with an embodiment of the invention.

The information module 200, as shown in FIG. 2, has a display 210 that can provide very specific instructions relating to a particular addition, removal, or transfer, providing information such as port numbers and/or rack locations, cord length information and/or whether a replacement cord is needed, etc. In addition to the display 210, the information module 200 may have a light 220 or other form of visual, audio, or vibratory indicator to indicate that new instructions have been presented or are accessible on the display. For example, a light 220 may blink or otherwise change state when the revisor acknowledges receipt of instructions (such as by pressing a button or key 230 on the portable controller) and/or turn off or otherwise change state when the necessary reconfigurational steps presented on the display 210 have been completed by the revisor. The information module 200 may be a device of custom design, or may be a type of small computer, such as a lap-top or hand-held computer. The computer system, among other things, may account for all patch cords, both currently installed and in storage, by type and length to ensure that the optimum cord for a particular reconfigurational step can be rapidly located.

Either as an alternative to, or as a supplement to, the above-described information module, an array of More sophisticated indicators (correspondingly proximately placed relative to the data ports) may be used in accordance with the invention. Indicators having at least two states, but preferably more than two states, are correspondingly disposed proximately to some or all of the ports in the LAN. A two-state indicator, for example, may be a simple light having an "on" state and an "off" state. More than two states may be indicated, by way of example, by a light capable of being "on", "off", or "blinking"; by lights capable of blinking at differing rates; by a pair of lights correspondingly proximate to some or all ports; and by lights capable of alternatively emitting one of a number of distinct colors. Within a given LAN, particular states or colors may universally represent particular steps. For example, a "continuously on" light may indicate the need for a cord to be inserted into the corresponding port, while a "blinking" light may indicate the need for a cord to be removed from the corresponding port (and a light that turns "off" may indicate that no additional action is needed with respect to the corresponding port).

In an embodiment of the invention, this system of improved output apparatus facilitates more efficient procedures for reconfiguring a LAN. For example, if one desires to perform the reconfigurational step of adding or installing a cord into two open ports of a LAN, the information module, after preferable acknowledgment, would first instruct the revisor to select an optimum type and length of patch cord. Additionally or alternatively, the information module would display or direct him to one or both of the two destination ports. For example, the information module may provide rack and port numbers or may even be programmed to display a map of the entire LAN or a section of the LAN with the particular port(s) indicated on the map.

Assuming for example that the revisor had been instructed as to the optimal cord and had obtained such cord, the information module would then direct the revisor to the general location of the first LAN port to which the cord should be installed. Upon reaching that general location, the revisor plugs a second end of the cord into an information module port or optionally a local system port and the first end of the cord into the first designated LAN port (identified by a light illuminated to a particular state, such as "continuously on"). If the first end has been installed into the correct LAN port, the system turns off the light corresponding to that LAN port while simultaneously providing directional instructions to the revisor relative to the second LAN port. The system may also concurrently illuminate the light corresponding to the second LAN port needing to be connected.

After removing the second end of the cord from the information module port or system port, the revisor travels to the general location of the second LAN port. When the revisor arrives at the second general location, he may, if the second port has already been identified by an illuminated light adjacent thereto, then plug the second end of the cord into the second LAN port, thereby completing the installation. Alternatively, the system may require him to plug the second end of the cord into a local system port, or a port on an information module connected thereto, at the second general location which prompts the system to illuminate a light next to the second LAN port, after which the revisor then removes the second end of the cord from the system port or information module port before inserting it into the second LAN port. In either case, the system senses the completion of the needed addition/installation, turns off the illuminated light, and proceeds to the next needed reconfigurational step, if any. If the revisor inserts either end into a wrong port, the light will not turn off and the revisor will thereby know he has erred before he proceeds with any subsequent steps. Furthermore, no subsequent steps will be provided by the system or information module until the present step is properly completed.

As compared with previous systems employing automatic documentation and reconfiguration instructions, the above apparatus and procedure facilitates the addition/installation step in that it immediately tells the revisor if he has plugged the cord into the correct LAN port. The change in the status of each light will not occur if he has not plugged the cord into the specified LAN port. In previous systems, when the revisor plugs the first end into a port, there is no indication that he has plugged it into the correct port. The present system, unlike its predecessors, also may provide specific information about the type and length of cord needed for the application. Additionally, the information module may direct the revisor to an illuminated LAN port to assist the revisor in finding it. Finding illuminated LAN ports, particularly in a large network, can be frustrating and expensively time-consuming.

The present inventive apparatus and method provide similar advantages to the step of removal. With respect to the removal step, after preferable acknowledgment by the revisor, the system illuminates a first LAN port corresponding to the first end of the cord to be removed. Simultaneously, the information module may direct the revisor to the location of the preferably blinking light (blinking indicates removal rather than insertion in a preferred embodiment). When the revisor removes the cord from the blinking LAN port, the system senses the broken connection and turns off the blinking light to indicate that the proper cord end was removed. The information module may direct the revisor to a second general location or a second LAN port corresponding to the second end of the cord to be removed and the system may begin to blink the light of the LAN port. Optionally, upon arriving at the second location, the revisor then plugs the free end of the cord into the information module port or system port and the system reacts by beginning to blink the light at the LAN port where the second end of the cord needs to be removed. When the second end of the cord is removed, the blinking light is turned off by the system to again confirm proper removal. The system may then instruct regarding the next step in the reconfiguration, whether the next step is an addition, removal, or transfer.

As compared with current automatic documentation and reconfiguration systems, the removal step is improved in that for each segment of the removal process, only one light is lit/blinking to indicate removal of a specified plug, and this light is turned off by the system only when and immediately when the plug is removed from the specified LAN port. Under prior systems, both lights are typically lit at first, and the removal of one end of the cord turns off both lights, making finding and removing the second end very difficult, time-consuming, and subject to error.

With regard to the transfer step, the system can theoretically determine and advise the revisor if a cord is long enough for a proposed transfer step or if a cord is longer than required and how much longer. After preferable acknowledgment, the light proximate to the end of the cord to be moved begins to blink while the information module directs the revisor to the corresponding LAN port. Once the first end of the cord is removed, the blinking light will turn off to confirm proper end removal and the light at the new destination port illuminates continuously. The information module directs the revisor to the newly illuminated port where he inserts the recently removed first end into its new location, thereby completing the transfer step and causing the system to turn off the illuminated port light. If, however, the cord is not of appropriate length to complete the transfer step, the revisor may push a designated button or key on the information module to prompt the computer to provide an alternative series of instructions, such as one that accomplishes the transfer by means of a removal followed by an addition. In this manner, the transfer can be effected and optimal cord length maintained, thereby avoiding deleterious slack.

As with the previous types of reconfigurational steps, several advantages accrue relative to status quo automatic documentation and reconfiguration systems with respect to a transfer. Each time the revisor plugs or unplugs a cord end as specified with regard to a LAN port, the light status at that LAN port immediately changes telling the revisor he has correctly completed that step. In addition, the system may direct the revisor to the location of the next step. The preferably multi-state output indicators (lights) avoid revisor confusion about when cords need to be inserted or removed and from which ports they need to be removed and into which ports they need to be inserted. Additionally, the present system may accomplish a transfer with fewer revisor steps than prior systems if the existing cord is appropriate for the new connection.

The prime advantage of one preferred embodiment of the inventive system is to illuminate only one LAN port light at a time and to turn that light off only when and immediately when the step required at that port has been correctly completed. In a preferred embodiment, plugging one end of an attached LAN cord into the information module port or system port is a key action in being able to ascertain more information from the system during the addition, removal, and transfer steps, and this feature very clearly sets the inventive apparatus and methods apart from prior systems. In an alternate embodiment of the invention, the lights at two LAN ports are on simultaneously during at least a part of the procedure, however, the light signal associated with each step at each LAN port changes only when and immediately when that step has been correctly completed.

In general, during normal operation of the system, a full scanning process and comparative analysis is repeated over a certain time interval such that the entire configuration of the LAN can be determined upon each polling and the results of a specific polling can be compared to those of an immediately previous one to indicate any configurational change which has been completed. While providing very complete information, this full scanning and analysis process may be lengthy in a large LAN and may cause significant delay between pollings. Most of the time, during normal use, such a delay is acceptable and not at all problematic. During a reconfiguration of the LAN, however, such a delay could potentially add significant time to the reconfiguration process because the revisor would have to wait for the system to complete a scan and analysis to confirm that each configuration change he had completed was correct, thereby rendering less effective the very advantageous indicator confirmation that is preferably immediate. To allay this potential problem, the inventive system contemplates the preferable use of a specialized targeted scan or targeted analysis of scan results during the revision process. Such a targeted scan or targeted focus on particular results could, for example, merely analyze the information module port or system port and any ports corresponding to illuminated lights (activated output indicators). Such a focused analysis would sense all proper configurational changes during the revision process, but would require only an infinitesimal fraction of the time delay necessitated by a full scanning and analysis process. This abbreviated analysis permits the effectively immediate confirmation provided by the invention.

The revision process and its preferred limited analysis would preferably be initiated by the acknowledgment of the revisor and would preferably be terminated by an automatic return to the global scan and analysis of normal operation upon proper completion of all the necessary steps of a revision.

Figure 3:
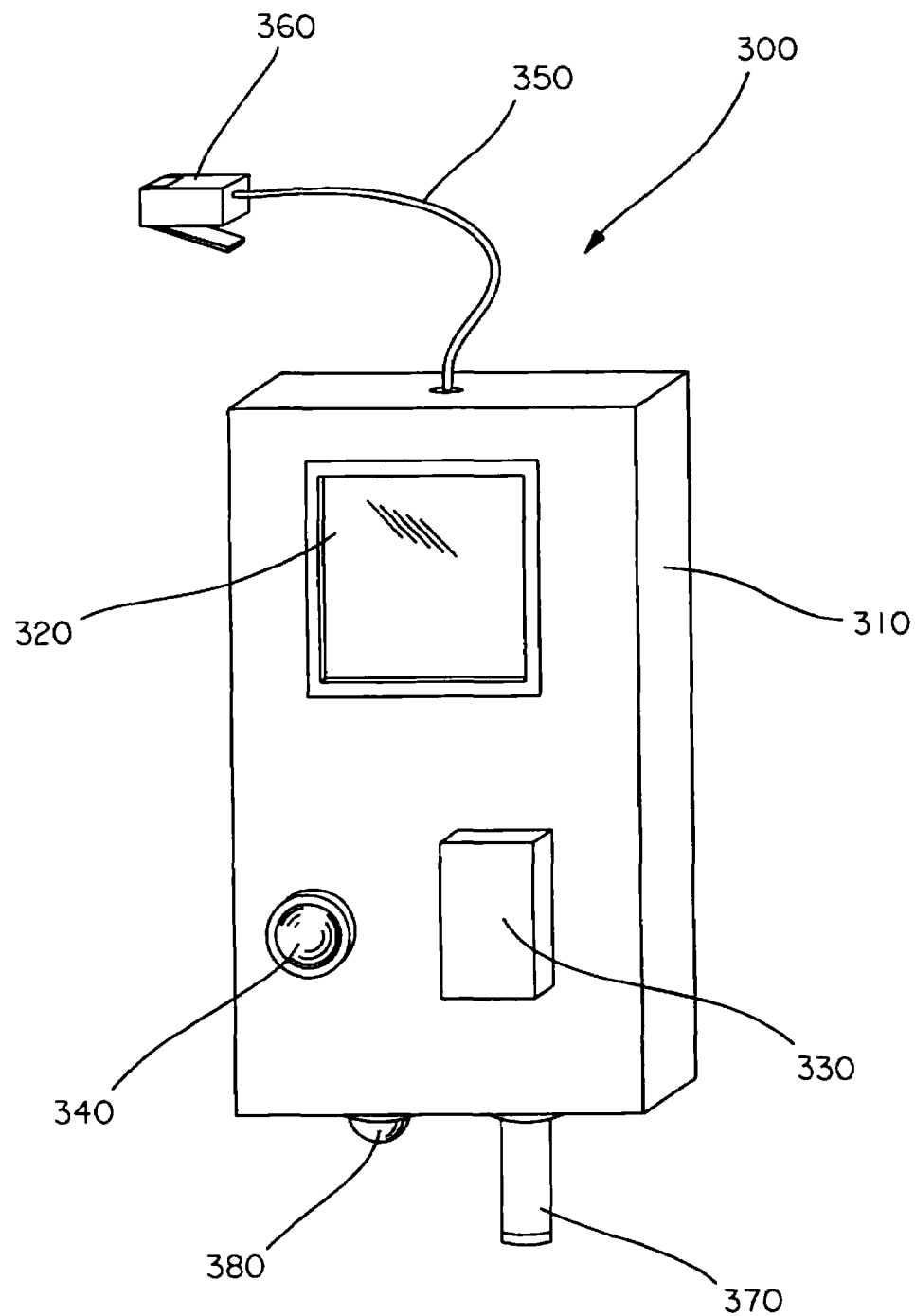
FIG. 3 is a schematic view of a third patch cord and a third probe tip in accordance with an embodiment of the invention.

One form of the invention contemplates the use of a probe by the revisor of the network configuration. The probe is preferably easy for the revisor to carry around with him, and each rack in the network preferably has a system outlet for plugging in the probe. Thus, the probe may have similar function for the information module except that, rather than receiving a patch cord already connected to a data port, the probe may be inserted into the data port. The probe 300, as shown in FIG. 3, preferably has a housing 310 with an LCD screen 320 to convey information about the system, revision steps, cord specifications, etc. during the revision process. The probe 300 may also have one or more push buttons or keys 330 whereby the revisor can input information into the system, such as an acknowledgment of receipt of instructions, indication that a particular cord does not meet specifications, etc. The probe 300 may include one or more integral signal lights 340 for alerting the revisor as to the presence of new instructions on the LCD screen 320 or providing supplemental information, for example. Emanating from the housing 310 of the probe 300 is a probe cable 350 having a probe plug 360 at the remote end thereof. The probe cable 350 preferably a multi-conductor electrical cable. The probe plug 360 is configured to mechanically and electrically cooperate with the system outlets such that the probe 300 can be plugged into the system from various locations within the network. As an alternative to the LCD screen being on the probe, an LCD or other display may be located in series with the probe cable. The probe 300 includes at least one conductive probe element 370 with which it can be placed in electrical contact with the system for the purpose of testing the location of a particular LAN port or plug. At least one embodiment of the invention provides for two differently configured probe elements emanating from the probe housing for testing different parts of the system. The housing may also include one or more lights 380 for illuminating an area in the direction of one or more of the probe elements 370 for assisting the revisor in better seeing where to contact a probe element 370 for system testing.

Use of the probe in the present invention is contemplated to be associated with conductive contact elements, such as port plates associated with and adjacent to each of the data ports in the LAN. Each such port plate is independently connected to the system. The system utilizes specialized cabling for making electrical connections between specified ports. In particular, the cords, like most other such cords, have plugs on each end of the cord for plugging into particular data ports. Unlike most other cords, however, the specialized cords contemplated to be in accordance with the invention include plug extensions extending transversely from the plugs and configured to cooperatingly mechanically and electrically engage the port plates associated with and adjacent to the respective ports into which the plug is inserted. In a preferable embodiment, the mechanical and electrical engagement between the plug extensions and the port plates may be encouraged by spring-loading or other biasing means. Of course, each plug extension must have a conductive contact element for electrically engaging the port plate, though it may also include insulative dielectric structure to provide mechanical strength and to protect against short circuits. The conductive portions of the plug extensions on opposite ends of a cord are in electrical contact with one another and are preferably electrically connected by a wire or the like in the cord. Each of the plug extensions may preferably also include an electrical contact ("plug plate") on the back thereof for providing a testing site for a probe element in accordance with the invention. Also, the plug extension may include a diode or other electrical element between the conductive portion which contacts the port plate and the plug plate on the back of the plug extension.

One embodiment of the invention functions as described below. The revisor plugs the probe plug into any system outlet. When a LAN cabling revision is to be performed, a signal light on the probe housing illuminates continuously or blinks rapidly to indicate to the revisor that a cabling revision is to be performed. In one embodiment of the invention, if the light is illuminated continuously, this indicates that the revisor must add/install a new cord into the system; if the light is blinking rapidly, this indicates that the revisor must subtract/remove a cord from the system. The processes for addition and removal of a cord are both two-step processes wherein each step deals with one of the two ends of the cord being added or removed.

In the case that the signal light is continuously illuminated, the screen on the probe housing will simultaneously indicate the type and length of cord required for the addition. After the revisor obtains the designated cord, he presses a push button or key on the probe housing or screen, thereby informing the system that he is in possession of the appropriate cord. Upon pushing the button or key, the system responds by providing the location in the LAN at which step one of the addition is to be made. Such information might include the room number, the rack number, the patch panel or equipment number, and the data port number. In this embodiment, the LCD screen displays only room and rack information. Once the revisor has traveled to the appropriate rack, he plugs the probe plug into the system outlet on the particular rack. If and only if the revisor has plugged the probe into the appropriate rack, the system will then turn on the illumination light, the signal light will again illuminate to a continuously "on" state, and new instructions will appear on the LCD screen. The new instructions will include the data port number (and possibly a patch panel or equipment number) into which one end of the cord is to be inserted. Once the revisor has found the LAN data port he believes to be the one specified by the LCD screen instructions, he touches the probe element to the port plate adjacent to and corresponding with the found port. Upon touching, and thereby making an electrical connection between the port plate and the probe element, the signal light on the probe will switch from its continuously on state to a slowly blinking state if and only if the correct port has been identified by the revisor. Upon removing the probe element from the port plate, the signal light on the probe housing will return to its previous continuously on state. if an incorrect port plate is touched by the probe, the signal light on the probe housing will not be affected. In this manner, the revisor can confirm the correctness of the port he has identified by noting whether the signal light changes state when the probe element is touched to the corresponding port plate. Upon determining that he has identified the correct port, the revisor then inserts one of the new cord plugs into the specified port. In doing so, the plug extension extending from the inserted plug will simultaneously cover and make electrical contact with the port plate corresponding to the port. Now the revisor confirms that he has inserted the cord plug into the correct port by touching the probe element to the plug plate on the back of the plug extension. The signal light on the probe housing will again change state from continuously on to slowly blinking if the cord plug was inserted into the correct port; otherwise, no change in the signal light on the probe housing will occur. The change of state will permit the revisor to know that he has correctly performed the first step of the addition while simultaneously informing the system that the first step is completed. Thus, when the revisor removes the probe element from the plug plate, the system again puts the signal light on the probe housing to a continuously on state while the LCD screen displays instructions to begin performance of the second step of the addition process.

If the second step of the addition process is at the same rack location, the illumination light stays on and the LCD screen displays the port number (and possibly patch panel or equipment number) where the second end of the new cord is to be inserted. If the second step is to be performed at a different rack, the illumination light will turn off, the location of the new rack is provided on the LCD screen, and the specific port information is withheld until the probe cord plug is inserted into the system outlet on the new rack. Once the revisor arrives at the new rack (or stays appropriately at the same rack) and is plugged into the system outlet, the port number/location (and possibly patch panel or equipment number/location) is displayed on the LCD screen. The revisor then goes through the same sequence of actions as with the first step of the addition process, namely confirming the correctness of the found port by touching the probe element to the corresponding port plate, inserting the free end (plug) of the cord into the identified and confirmed port, and testing the correctness of the insertion by probing the plug plate on the back of the plug extension. After the revisor removes the probe element from the plug plate of the correctly inserted plug, the signal light on the probe housing turns off to indicate that the addition has been correctly completed.

In the case that the signal light is blinking rapidly, thereby indicating the need for a cord removal rather than a cord addition, the screen on the probe housing will simultaneously indicate information about where the first step of the removal is to occur. Though the system may immediately indicate the room number, the rack number, the patch panel or equipment number, and the port number, in this embodiment, the LCD screen displays only room and rack information initially. Once the revisor has traveled to the appropriate rack, he plugs the probe plug into the system outlet on the particular rack and the signal light on the probe housing will blink rapidly while the LCD screen simultaneously displays specific patch panel or equipment and/or port number information and the illumination light turns on. Once the revisor has found the port he believes to be the one specified by the LCD screen instructions, he touches the probe element to the plug plate on the back of the plug extension extending from the plug already disposed in the found port to confirm the correctness of the identified plug. If the correct plug has been probed, the signal light will change states from a fast blink to a slow blink to confirm the correctness thereof to both the revisor and the system. When the probe element is removed from the plug plate, the signal light returns to its fast blinking condition. The revisor then removes the plug from the port, after which he confirms the correctness of his action by touching the probe element to the port plate uncovered by the plug removal. Assuming the revisor has correctly performed the operation, the signal light will again change to slow-blinking until the probe element is removed from contact with the port plate. Thus, when the revisor removes the probe element from the port plate, the system again puts the signal light on the probe housing to a fast-blinking state while the LCD screen displays instructions to begin performance of the second step of the removal process.

If the second step of the removal process is at the same rack location as was the first, the illumination light stays on and the LCD screen displays the port number (and possibly patch panel or equipment number) where the second end of the cord is to be removed. If the second step is to be performed at a different rack from the first, the illumination light will turn off, the location of the new rack is provided on the LCD screen, and the specific port information is withheld until the probe cord plug is inserted into the system outlet on the new rack. Once the revisor arrives at the new rack (or stays appropriately at the same rack), the LAN port number/location (and possibly patch panel or equipment number/location) is displayed on the LCD screen. The revisor then goes through the same sequence of actions as with the first step of the removal process, namely confirming the correctness of the found plug by touching the probe element to the corresponding plug plate, removing the identified and confirmed plug from its data port, and testing the correctness of the removal by probing the uncovered port plate corresponding to the now-empty port. After the revisor removes the probe element from the port plate, the signal light on the probe housing turns off to indicate that the removal has been correctly completed.

When a first end of an already installed system cord needs to be relocated to a different port while the second end of the cord remains in the same port, this process is referred to as a transfer. A transfer according to the currently described embodiment of the invention is achieved ideally by performing step one of the removal process on an end of a cord immediately followed by performing step two of the addition process with the same end of the same cord. Among other identities, the signal light will change state as it did relative to the respective afore described addition and removal steps and the sequences for probe testing/confirming the system are the same as with the respective afore described addition and removal steps. If, however, the already installed cord is insufficiently long (or, in some cases, overly long) for its new configuration, the revisor presses a push button or key on the probe housing to indicate this fact, and the system responds by breaking the transfer process into a complete cord removal followed by a complete cord addition. This change can occur at the outset of the transfer or after step one of the removal process is complete and the revisor subsequently determines that the cord is of inappropriate length for the new configuration.

In order for the system to recognize that particular ones of the above-described steps have been performed, the system needs to be able to differentiate, via the probe element, whether contact is being made with a port plate or a plug plate overlying a port plate. Though the invention contemplates many different apparatus and methods for making this differentiation, as well as many different apparatus and methods for more generally facilitating the revision process, several specific exemplary embodiments are described below.

In one embodiment, shown schematically in FIG. 1, a diode is included in each of the cord plugs such that the diode is interposed between the plug extension, which is the conductive portion of the plug that contacts the port plate, and the plug plate at the back of the plug. This diode can be used to provide differentiation in the signal between the plug plate and the underlying port plate. Specifically, the port plate may provide an electrical signal which is an alternating current (AC) voltage, while the diode converts such AC signal to a pulsating direct current (DC) voltage provided at the plug plate. Thus, the system can determine whether a single probe element is touching a plug plate or the underlying port plate by whether the signal detected by the probe is DC or AC, respectively. To prevent confusion by the revisor, a port plate is not accessible by the probe element when there is an overlying plug extension (i.e. a plug is disposed in the corresponding port).

In a second embodiment, shown schematically in FIG. 2, the probe includes two distinct probe elements, one which electrically and/or mechanically cooperates only with the port plates and one which electrically and/or mechanically cooperates only with the plug plates. For example, the probe may have a pin-type probe element that can only engage the port plates and a coaxial probe element extension that can only engage the plug plates. The two probe elements of the second embodiment may emanate from different places in the probe housing or may diverge from a common connector to the housing.

Each of the two probe contacts is connected to the system by a separate conductor in the probe cable. A common signal is applied to each selected port plate and received by the system when the probe is electrically connected to the port plate or to the plug plate of a connected plug. The system differentiates between the connection types based on which conductor in the probe cable the signal is transmitted.

In another embodiment, shown schematically in FIG. 3, the network includes ports having ten-contact jacks compatible and connectable with ten-wire cords having a ten-contact plug at each end thereof. In such an embodiment, eight wires (and contacts) serve to transmit communications data between respective ports while the ninth wire/contact is reserved for the transmission of signals relating to the connection status of the network. In particular, the ninth contact in the port jack serves an analogous function to the port plate in the embodiments described above, a testing site associated with the port; thus, the presently described embodiment does not require any port plates or other conductive apparatus outside or adjacent particular data ports. Furthering the analogy to previously described embodiments, the ten-contact plug includes a plug plate on the back thereof for providing a probe-testing site when a plug is disposed within a port jack. The ninth contact of the jack is covered by a plug disposed in the jack so that it cannot be probed inadvertently when the plug is in place. There may be electrical hardware, such as a diode, between the plug/probe contact of the cable and the plug plate probe for differentiating the signal between the two testing sites and thereby permitting the probe to differentiate between the respective testing sites, or, as is shown in FIG. 3, distinct probe elements may be employed to indicate which type of testing site is being probed. Of course, the probe element(s) would be configured in such an embodiment to be compatible with the ninth jack contact and the plug plate.

Another embodiment of the invention includes the presence of a distinct indicator, such as an LED, adjacent some or all of the ports in the network. The indicator corresponding to a port where a process step needs to be performed changes state in the same manner and at the same times as does the indicator light of the probe housing in previously described embodiments, but in this embodiment the indicator also serves the purpose of assisting the revisor in finding/identifying the port described on the visual display of the probe housing. These port-adjacent indicators could be supplemental to the indicator light on the probe housing, in which case the port-adjacent indicators could be present adjacent any desired subset of ports, if not adjacent every port in the system. If the port-adjacent indicators are alternative to, rather than supplemental to, the indicator light on the probe housing, however, then an indicator should be present adjacent each port in the system to avoid revisor confusion.

Another embodiment of the invention is directed to facilitating multiple concurrent revisions to a single system. This embodiment contemplates multiple probes being used by multiple revisors simultaneously to reconfigure a network more quickly while maintaining the accuracy promoted by the processes described in the previous embodiments. For example, different signals could be applied to distinct port plates concurrently whereby each probe could be configured or tuned to identify only particular ones of the different signals. The different signals could vary in frequency, amplitude, or any other relevant aspect. The AC-to-DC conversion could be employed in this embodiment to differentiate AC signals provided at respective testing locations, and the pulsating DC signals utilized to facilitate such multiple revisor embodiments. Such concurrent revisions could be performed regardless of specific apparatus issues, such as whether port plates or ninth contacts were used, for example.

Another embodiment of the invention utilizes the apparatus and methods discussed above in a system capable of determining if two port plates are electrically connected together by applying a signal to one of the two port plates and sensing the other port plate. In particular, a system in accordance with this embodiment of the invention could determine that a complete cord addition has been effected without the final addition process step of probing the plug plate on the back of a plug extension or a ten-contact jack. The system confirms the completion of the addition process by sensing the existence of a previously absent electrical connection between the port plates associated with the two ports connected by the added cord. Similarly, a system in accordance with this embodiment could determine that the first step in a cord removal has been effected without the probing of the port plate exposed by the removal of one end of the cord. The system confirms this step instead by sensing the lack of a previously existent electrical connection between the port plates of the two ports previously connected by the cord.

During the revision process, the system preferably stops any scanning process it may be running and introduces a signal voltage to each of the port plates adjacent the LAN port(s) where a revision step is to be made. The signal voltage can be applied simultaneously to multiple port plates or may be selectively or sequentially applied. The inventive apparatus and methods can also be employed, however, in a system that does not employ a revision process separate from the normal scanning process. In such an embodiment, the scanning process could be employed to place the appropriate electrical signal(s) on the associated port plate(s). Such a system, however, would necessitate that the various probing steps, e.g., placing the probe element(s) in contact with the port and plug plates, to occur for sufficient duration to be noticed by the scanning process. Depending upon the size of the system, the processing speed of the system, and other such factors, the delay inherent in utilizing the scanning process in this fashion may be completely manageable or may be an entirely unmanageable impediment to operating the invention.

Software executes each revision process in response to a desired revision which is input into the system and in response to the signals received from the probe. The signals provide confirmation of the performance of specific actions by the revisor, both to the revisor through state changes in the signal light on the probe housing, and to the system through signals that are returned to the system from the plug and port plates, through the probe element, the probe, and the probe cord into the system outlet.

The inventive apparatus and methods for efficient network reconfiguration have several benefits over previous revision systems. First, the inventive system provides a mechanism for determining and confirming each particular action involved in a revision, namely the identification of ports and plugs, and the insertion or removal of the plugs into and from the ports. Prior systems generally relied upon electrical connections between distinct ports being established or broken before the system could recognize that a number of actions had already taken place. In the inventive system, it is not necessary to determine whether or not any two distinct ports are connected to one another. In particular, each action is confirmed to both the revisor and the system. Second, some prior systems require that indicators, such as light emitting diodes (LEDs) or other types, be arrayed on the racks in correspondence with each of the LAN ports so that the lights could direct the revisor to specified ports and/or provide confirmation of port-to-port connections established or broken; while at least one embodiment of the invention employs such indicators, they are unnecessary with most of the embodiments of the present inventive apparatus and methods.

One form of the invention contemplates the use of a probe by the revisor of the network configuration. The probe is preferably easy for the revisor to carry around with him, and each rack or site in the network preferably has a specialized system outlet for plugging in the probe such that it may electrically communicate with the system. In addition to its structure discussed below, the probe or probe cable may have an LCD or other type screen, LED, or other output device to convey information about the system, e.g., revision steps, cord specifications, and/or port locations, or such information may be conveyed to the revisor by separate means. The probe may also have one or more buttons or keys whereby the revisor can input information into the system, such as an acknowledgment of receipt of instructions, indication that a particular cord does not meet specifications, etc.

In accordance with the present invention, the probe includes a probe cable having one or more electrical conductors disposed therein, the cable having a plug on one end suitable for plugging into a specialized system outlet and a plug on the other end for insertion into the back of a patch cord plug. The patch cord includes a cable having a plug on each end thereof, each plug suitably configured for being inserted into a LAN port in the system. Each plug of the patch cord preferably has a biased latch for facilitating retention of the plug in a LAN port and removal of the plug from the LAN port when desired. Each plug further includes a special plug contact on a stepped front portion of the plug and each LAN port has a conductive port plate disposed adjacently thereto whereby the plug contact on a patch cord plug touches the adjacent port plate when the plug is fully inserted into the LAN port. Each of the port plates is independently electrically connected to the system. The plug contact is preferably spring-loaded to ensure sufficient mating force between the plug contact and the port plate adjacent the LAN port.

The probe plug opposite the end for plugging into the system outlet includes a probe head and pins emanating forwardly therefrom for insertion into the back of a plug from the patch cord. In the shown embodiment, the back of the plug includes a pair of spaced sockets and the probe includes on the front of its head a pair of pins insertable into the sockets such that they are placed in electrical contact with the plug contact from the plug. The probe further includes a spring-loaded forked retainer on the top it its head facilitating the releasable retention of the probe in the back of the plug. In particular, the spring-loaded fork retainer includes a pair of forked fingers at its front most portion, a central portion generally perpendicular to the fingers and a thumb lever angled rearwardly from the central portion. At the rear of the probe head emanates the probe cable and also preferably an LED or other visual indicator for indicating the status of a particular connection or revision.

To insert the probe into the back of a plug, the revisor puts his hand generally around the head of the probe, depresses the thumb lever of the spring-loaded fork retainer to lift the fork portion above the top of the plug and provide clearance for the probe to be inserted, inserts the pins on the front of the probe head into the sockets on the back of the plug while the face of the head comes flush with the back of the plug, and releases the thumb lever to permit the fork portion of the spring-loaded retainer to straddle the plug contact on the stepped front portion of the plug and simultaneously prevent the probe pins from being removed from the sockets by tension being applied to the probe cable. To remove the probe from a plug, the reverse procedure is followed. Namely, the revisor generally grips the probe head in his hand, depresses the thumb lever to disengage the spring-loaded retainer fork from the front stepped portion of the plug, pulls the probe away from the plug such that the pins on the front face of the probe disengage from the contacts in the sockets on the back of the plug, and then, once the probe is sufficiently disengaged, releases the thumb lever to permit it to return to its natural, biased state.

The LED or other indicator on the probe head functions similarly to the LED's or other indicators discussed in the previously filed U.S. patent applications discussed above, although relative to some of the embodiments discussed therein, the one light on the probe head may be utilized instead of permanently installing lights adjacent to each of the many LAN ports in the system. As is required in some of the previous embodiments, a LAN plate or other electrical contact permanently connected to the system is required to be disposed adjacently to each of the LAN ports in the system such that the plug contact can electrically and mechanically mate therewith when the plug is inserted into the LAN port. Thus, one electrical conductor in the probe cable is electrically connected to the spring-loaded plug contact, and thereby indirectly to the port plate, when the probe is connected to a plug which is installed in a LAN port (the other end of this electrical conductor being connected to the system). Two additional electrical conductors in the probe cable are connected to the LED or other indicator on the probe head with the other ends of these additional electrical conductors being connected to the system.

The installation of a new patch cord into a network with the apparatus and method of the present invention is thus carried out as follows. Instructions are preferably provided to the revisor as to where to insert one or both ends of the patch cord, e.g., the revisor may be informed either through printed instructions or through a visual display with the room number, rack number, patch panel number and/or port number to direct him to the LAN port into which the first end of the patch cord is to be inserted. Once the revisor arrives at what he believes to be the proper LAN port, he plugs the probe tail into the nearest system outlet and inserts the probe head into the back of one plug on the patch cord. He then inserts the plug having the probe attached to it into the LAN port he previously identified from his instructions and observes the light on the probe. Preferably for a patch cord installation, the probe light is initially continuously on once the probe is plugged into the system outlet and the system confirms that the plug has been inserted to the correct LAN port by turning the probe light off. If the plug is inserted into an incorrect LAN port, there will be no change in the status of the probe light, i.e., the probe light will remain continuously on. Once the revisor has the plug inserted into the correct LAN port, he removes the probe from the inserted plug, the probe light goes on, and the revisor searches for the second LAN port into which the opposite end of the patch cord is to be inserted. Once he has identified the LAN port he believes to be the correct site for the second end of the patch cord, the revisor performs the same operation wherein he applies the probe to the second plug on the patch cord prior to inserting the plug into the LAN port he believes to be the correct one for the second end of the patch cord. Again, the correctness of the port is indicated by the probe light going off. As an alternative, the system determines if the second end of the patch cord has been installed in the correct LAN port without attaching the probe.

A reverse procedure is employed for the removal of a patch cord from a LAN configuration. When a cord is identified to be removed by the system, e.g., through written or displayed instructions, the revisor first identifies the LAN port having a plug therein from which he believes the plug is to be removed. With the probe tail plugged into a system outlet (preferably the nearest) he then applies the probe head to the still-installed plug. Prior to engagement of the probe, the LED on the back of the probe head preferably is blinking slowly to indicate that a cord removal is necessary. After engaging the probe to the plug, the status of the LED will change, e.g., to blinking rapidly, if the LAN port is the correct one. Once the revisor has received confirmation that he has plugged the probe into the correct plug, he then removes the plug and the LED will blink slowly. He then moves the probe to the plug on the other end of the cord and if it is the correct plug, the LED will blink rapidly. He then removes the plug and the LED will go off.

Although there are many ways in which an automated documentation and revision system could determine which ports are electrically connected to which other ports, one currently considered as preferable employs a distinct electrical contact associated with each port in the LAN and an electrical conductor within each LAN cord for electrically connecting the two contacts associated with the respective ports connected by the cord. The present system, like prior known systems, detects this electrical connection in arriving at the global LAN configuration, but only the inventive system utilizes the cord conductor connected to the information module port or system port in conjunction with the revision process, as well as with the global scanning and analysis process.

It should be noted that the above-described invention contemplates many embodiments and is not limited to the described embodiments. For example, and without limitation, use of the information module is optional.

What is claimed is:

1. A method of inserting a patch cord into first and second data ports in a local area network (LAN) comprising a computer system that controls the LAN, a plurality of data ports, a plurality of local system ports in communication with the computer system, and a visual indicator adjacent to each data port, the method comprising:

the computer system determining whether instructions to insert the patch cord into the first data port have been correctly completed by analyzing a temporary connection formed by insertion of one end of the patch cord into one of the data ports and insertion of another end of the patch cord into one of the system ports;

of the visual indicators adjacent to the data ports, altering a state of only the visual indicator adjacent to the first data port after the computer system determines that the instructions have been correctly completed to indicate that the instructions have been correctly completed, the state being altered before subsequent instructions to insert the other end of the patch cord into the second data port have been completed, the patch cord having been removed from the one of the system ports, thereby terminating the temporary connection, before the subsequent instructions have been completed;

providing the subsequent instructions after the instructions have been correctly completed, the second data port belonging to the subset of the plurality of data ports; and of the visual indicators adjacent to the data ports, altering a state of only the visual indicator adjacent to the second data port after the subsequent instructions have been correctly completed to indicate that the subsequent instructions have been correctly completed.

2. The method of claim 1, further comprising withholding the subsequent instructions until the instructions have been correctly completed.

3. The method of claim 1, wherein the state is altered only after the instructions have been correctly completed.

4. The method of claim 1, further comprising activating the visual indicator associated the second data port only after the instructions have been correctly completed.

5. The method of claim 1, further comprising activating the visual indicators adjacent to the first and second data ports prior to the patch cord being inserted into the first data port.

6. The method of claim 1, further comprising, of the visual indicators adjacent to the first and second data ports, activating only the visual indicator adjacent to the first data port prior to the patch cord being inserted into the first data port.

7. The method of claim 1, further comprising altering the state differently depending on whether the instructions have been correctly or incorrectly completed.

8. The method of claim 1, further comprising altering a state of a visual indicator on the patch cord at least one of in same manner or at the same time as a visual indicator not on the patch cord.

9. The method of claim 1, further comprising providing a plurality of visual indicator states that are different from each other and that include a first visual indicator state before insertion into the first data port, a second visual indicator state before removal from the first data port, a third visual indicator state after correct insertion into the first data port, and a fourth visual indicator state after incorrect removal from the first data port.

10. The method of claim 1, further comprising targeting only data ports having activated visual indicators, the targeting comprising:

scanning the data ports having activated visual indicators;

analyzing the data ports having activated visual indicators to determine whether the instructions or the subsequent instructions have been correctly or incorrectly completed; and limiting at least one of the scanning and analyzing to only the data ports having activated visual indicators.

11. The method of claim 10, further comprising initiating the targeting from scanning and analysis of at least all data ports using a manually-activated input.

12. The method of claim 10, further comprising automatically terminating the targeting and returning to scanning and analysis of at least all data ports.

13. The method of claim 1, further comprising:

providing directions to a general location of the first data port; and altering the state of the visual indicator adjacent to the first data port only after an end of the patch cord is inserted into a local system port at the general location.

14. The method of claim 13, wherein the end of the patch cord inserted into the local system port at the general location and an end of the patch cord inserted into the first data port are different.

15. The method of claim 13, further comprising providing additional directions to the first data port only after the end of the patch cord is inserted into the local system port at the general location.

16. The method of claim 1, further comprising initiating determination of whether the instructions have been correctly completed using a manually-activated input.

17. The method of claim 1, further comprising limiting directions to the first data port to a general location until a manually-activated input is activated.

18. A method of inserting a patch cord into first and second data ports in a system comprising a visual indicator and a local area network (LAN) containing a computer system that controls the LAN, a plurality of data ports, a plurality of local system ports in communication with the computer system, the visual indicator separable from the data ports, the method comprising:

the computer system determining whether instructions to insert the patch cord into the first data port have been correctly completed by analyzing a temporary connection formed by insertion of one end of the patch cord into one of the data ports and insertion of another end of the patch cord into one of the system ports;

altering a state of the separable visual indicator in response to the computer determining that the instructions have been correctly completed to indicate that the instructions have been correctly completed, the state being altered before subsequent instructions to insert the other end of the patch cord into the second data port have been completed, the patch cord having been removed from the one of the system ports, thereby terminating the temporary connection, before the subsequent instructions have been completed;

withholding the subsequent instructions until the instructions have been correctly completed;

providing directions to a general location of at least one of the first or second data port; and providing further directions to the at least one of the first or second data port in response to an end of the patch cord being inserted into a local system port at the general location.

19. The method of claim 18, wherein the patch cord comprises the separable visual indicator.

20. The method of claim 18, wherein a portable device comprises the separable visual indicator, the portable device further comprising a display and a manually-activated input.

* * * * *

UNITED STATES PATENT AND TRADEMARK OFFICE
CERTIFICATE OF CORRECTION

PATENT NO. : 7,370,106 B2 Page 1 of 1
APPLICATION NO. : 09/992034
DATED : May 6, 2008
INVENTOR(S) : Jack E. Caveney It is certified that error appears in the above-identified patent and that said Letters Patent is hereby corrected as shown below:

Col. 5, line 56 change "feb and No." to -- February 23, 2001; and No. --.

Col. 5, line 65 change "to tile data ports 134" to -- to data ports 134 --.

Col. 6, line 54 change "an array of More" to -- an array of more --.

Col. 11, line 45 change "continuously on state. if an" to -- continuously on state. If an --.

Signed and Sealed this

Fifth Day of August, 2008

JON W. DUDAS
*Director of the United States Patent and Trademark Office*